United States Patent
Jiang

(10) Patent No.: US 11,320,118 B2
(45) Date of Patent: May 3, 2022

(54) COMBINED-TYPE DYNAMIC EFFECT WHEEL AND STAGE LIGHT PROVIDED WITH SAME

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd.

( * ) Notice: Subject to any disclaimer, the term of this patent is extended or adjusted under 35 U.S.C. 154(b) by 0 days.

(21) Appl. No.: 17/038,278

(22) Filed: Sep. 30, 2020

(65) Prior Publication Data

US 2021/0010659 A1  Jan. 14, 2021

Related U.S. Application Data

(63) Continuation of application No. PCT/CN2019/123346, filed on Dec. 5, 2019.

(30) Foreign Application Priority Data

Feb. 1, 2019 (CN) .......................... 201920189851.3

(51) Int. Cl.
  *F21V 14/08* (2006.01)
  *F21W 131/406* (2006.01)
  (Continued)

(52) U.S. Cl.
  CPC ............ *F21V 14/08* (2013.01); *F21S 10/007* (2013.01); *F21S 10/026* (2013.01); *F21V 14/085* (2013.01);
  (Continued)

(58) Field of Classification Search
  CPC ...... F21V 14/08; F21V 14/085; F21S 10/007; F21S 10/026; F21W 2131/406; F21L 15/04; G02B 26/008
  See application file for complete search history.

(56) References Cited

U.S. PATENT DOCUMENTS 4,894,760 A * 1/1990 Callahan ................ F21S 10/02
                                                    362/293
5,198,939 A * 3/1993 Hewett .................. G02B 5/005
                                                    250/233
(Continued)

FOREIGN PATENT DOCUMENTS

CN  202024237 U  11/2011
CN  107795962 A   3/2018
(Continued)

OTHER PUBLICATIONS

International Search Report for PCT/CN2019/123346 dated Mar. 9, 2020; 2 pages.

*Primary Examiner* — Alexander K Garlen
*Assistant Examiner* — Colin J Cattanach
(74) *Attorney, Agent, or Firm* — Lerner, David, Littenberg, Krumholz & Mentlik, LLP

(57) ABSTRACT

A combined-type dynamic effect wheel includes a light source and an effect wheel bottom plate. The effect wheel bottom plate is provided with a light-through hole and several pattern bases, each pattern base being provided with a pattern sheet. A first rotating assembly and a second rotating assembly are provided at the center of the effect wheel bottom plate, and the effect wheel bottom plate is driven by the first rotating assembly to rotate so as to enable different pattern bases or the light-through hole to be switched in or out of a light beam; the pattern base is provided with a driven assembly; and the size of an effective pattern on the pattern sheet is greater than the size of an effective light spot of the light beam passing through the pattern sheet.

12 Claims, 5 Drawing Sheets

(51) Int. Cl.
*F21S 10/00* (2006.01)
*G02B 26/00* (2006.01)
*F21S 10/02* (2006.01)

(52) U.S. Cl.
CPC ..... *F21W 2131/406* (2013.01); *G02B 26/008* (2013.01)

(56) References Cited

U.S. PATENT DOCUMENTS

| | | | | |
|---|---|---|---|---|
| 5,282,121 A * | 1/1994 | Bornhorst | ............... | F21V 29/56 362/294 |
| 5,402,326 A * | 3/1995 | Belliveau | .............. | F21S 10/007 359/813 |
| 5,758,955 A * | 6/1998 | Belliveau | .................. | F21V 9/04 362/293 |
| 5,988,835 A * | 11/1999 | Allen | .................... | F21S 10/007 362/284 |
| 7,370,990 B2 * | 5/2008 | Juřik | .................... | F21S 10/007 362/227 |
| 7,703,948 B2 * | 4/2010 | Dalsgaard | ............. | F21V 17/002 362/281 |
| 8,061,874 B2 * | 11/2011 | Bornhorst | ............... | G03F 7/0005 362/293 |
| 8,752,985 B2 * | 6/2014 | Quadri | .................. | F21S 10/007 362/322 |
| 2002/0015305 A1 * | 2/2002 | Bornhorst | ......... | G02F 1/133385 362/293 |
| 2002/0075685 A1 * | 6/2002 | Rasmussen | ........... | F21V 17/002 362/282 |
| 2003/0076681 A1 * | 4/2003 | Rasmussen | ........... | F21S 10/007 362/280 |
| 2009/0109680 A1 * | 4/2009 | Belliveau | ................ | F21V 21/15 362/277 |
| 2009/0109681 A1 * | 4/2009 | Jurik | ..................... | F21V 17/105 362/284 |
| 2009/0268466 A1 * | 10/2009 | Allegri | .................... | F21V 5/048 362/268 |
| 2009/0323355 A1 * | 12/2009 | Mahaffey | ............... | F21S 10/007 362/323 |
| 2010/0208475 A1 * | 8/2010 | Sherman | ................ | F21S 10/007 362/418 |
| 2011/0090708 A1 * | 4/2011 | Salm | ..................... | F21S 10/007 362/449 |
| 2011/0110103 A1 * | 5/2011 | Quadri | ................. | G02B 26/008 362/322 |
| 2011/0116269 A1 | 5/2011 | Jurik | | |
| 2011/0249442 A1 * | 10/2011 | Jurik | .................... | F21S 10/007 362/277 |
| 2013/0094219 A1 * | 4/2013 | Jurik | ...................... | F21V 14/00 362/322 |
| 2013/0208479 A1 * | 8/2013 | Allan | .................... | F21S 10/007 362/271 |
| 2016/0084457 A1 * | 3/2016 | Jurik | ...................... | F21V 11/08 362/324 |
| 2017/0031125 A1 * | 2/2017 | Lee | ........................ | G02B 7/003 |

FOREIGN PATENT DOCUMENTS

| | | |
|---|---|---|
| CN | 108006576 A | 5/2018 |
| CN | 208295780 U | 12/2018 |
| CN | 209540748 U | 10/2019 |

* cited by examiner

COMBINED-TYPE DYNAMIC EFFECT WHEEL AND STAGE LIGHT PROVIDED WITH SAME

CROSS REFERENCE TO RELATED APPLICATIONS

The present application is a continuation of International Application No. PCT/CN2019/123346, filed on Dec. 5, 2019, which claims priority from Chinese Patent Application No. 201920189851.3 filed on Feb. 1, 2019, all of which are hereby incorporated herein by reference.

TECHNICAL FIELD

The present invention relates to the technical field of stage lights, and in particular to a combined-type dynamic effect wheel and a stage light provided with the same.

BACKGROUND ART

In the technical field of stage lights, in order to generate a dynamic effect, a dynamic effect wheel is usually provided. The dynamic effect wheel is configured that a pattern wheel for achieving a dynamic effect is switched into a light path, and the dynamic effect wheel continuously rotates such that patterns on the wheel pass through the light path in succession, thereby generating the dynamic effect.

Existing dynamic effect wheels generally use a switch-in structure. The switch-in structure further includes a linear motion switch-in structure and a swing arm rotation switch-in structure, which have generally similar working principles. The structure of a conventional swing arm rotation switch-in dynamic effect wheel is as shown in FIGS. 1 and 2, comprising a dynamic wheel 101 and a swing arm 102 connected to the dynamic wheel 101, wherein the circumference of the dynamic wheel 101 is provided with a pattern region 5, the swing arm 102 is provided with a swing arm rotating shaft 103, and the swing arm rotating shaft 103 rotates for switching into or out of a light path; the center of the dynamic wheel 101 is provided with a dynamic wheel rotating shaft 104, and the dynamic wheel rotating shaft 104 drives the dynamic wheel 101 to rotate around the center thereof. When the dynamic wheel 101 is switched into a light path, the dynamic wheel 101 rotates around the dynamic wheel rotating shaft 104. When a light path spot A is located in the pattern region 5, and the patterns on the dynamic wheel 101 pass through the light path in succession to achieve a dynamic effect. Specifically, as shown in FIG. 1, for a conventional swing arm rotation switch-in dynamic effect wheel structure, when in a non-working state, the dynamic wheel 101 is located outside the light path spot A under the drive of a swing arm rotating shaft 103; as shown in FIG. 2, when a dynamic effect needs to be generated, the swing arm rotating shaft 103 rotates to switch the dynamic wheel 101 into a light path, and the light path spot A is located in the pattern region 5 of the dynamic wheel 101; and the dynamic wheel 101 rotates around the dynamic wheel rotating shaft 104, and the patterns on the dynamic wheel 101 pass through the light path in succession, thereby generating a dynamic effect.

However, the switch-in and switch-out operation of the existing dynamic wheel and related structures thereof need to occupy a large space, and the effect wheel has only a single dynamic wheel that usually can only generate one dynamic effect, so as to generate a single dynamic pattern.

SUMMARY

The present invention aims to overcome at least one defect of the prior art mentioned above, provides a combined-type dynamic effect wheel and a stage light provided with the same, and solves the technical problem that the existing dynamic effect wheel has a single dynamic effect.

According to the present invention, a combined-type dynamic effect wheel, comprising a light source and an effect wheel bottom plate. The effect wheel bottom plate is provided with a light-through hole and at least one pattern base, and each of the pattern bases is provided with a pattern sheet. A pattern distribution region in the pattern sheet defines an effective pattern region. A light beam emitted by the light source can selectively pass through the light-through hole or is projected out through the pattern base, and a light spot with an obvious boundary formed by the emitted light beam defines an effective light spot. A first rotating assembly and a second rotating assembly are provided at the center of the effect wheel bottom plate. The effect wheel bottom plate can be driven by the first rotating assembly to rotate so as to enable different pattern bases or the light-through hole to be switched in or out of a light beam. The pattern base is provided with a driven assembly, which is fitted and connected to the second rotating assembly and is driven by the second rotating assembly to rotate so as to drive the pattern sheets to rotate. The size of an effective pattern on the pattern sheet is greater than the size of an effective light spot of the light beam passing through the pattern sheet. When one pattern sheet is switched into a light path, the pattern sheet forms a dynamic pattern effect during the rotation.

In the present invention, the pattern base is provided with a pattern sheet for switching into a light path of a light source to generate a pattern effect. In general, a region for a mounting part is reserved at an edge of the pattern sheet, and on the pattern sheet, the region outside the region for the mounting part is a pattern distribution region, and the pattern distribution region defines an effective pattern region. After the light beam is emitted, except the part of surrounding stray light, a light spot with an obvious boundary is formed and defines an effective light spot. By means of rotating the effect wheel bottom plate at different angles, different pattern bases or the light-through hole can be switched into the light path. The pattern bases continuously rotate in the light path, and the pattern sheets on the pattern bases pass through the light path in succession so as to form a dynamic pattern effect. Different pattern bases are switched into the light path to generate different dynamic pattern effects. The present invention can achieve switching of multiple dynamic pattern effects as desired under the drive of the same driving structure, has a simple in structure, and is convenient for installation and easy for implementation.

Further, the size of the effective pattern on the pattern sheet is greater than twice the size of the effective light spot of the light beam passing through the pattern sheet, and when the pattern sheet is switched into a light path, the effective light spot of the light beam passing through the pattern sheet is distributed outside the center point of the pattern sheet.

The effective light spot of the light beam passing through the pattern sheet is distributed outside the center point of the pattern sheet, and if the center of the pattern sheet coincides with the center of the light spot, the effect generated by the wheel is a pattern rotation effect, rather than a dynamic effect which is also referred to as a fire wheel effect. The size of the effective pattern on the pattern sheet is greater than twice the size of the effective light spot of the light beam passing through the pattern sheet, such that the projected light spot pattern is more complete and more attractive and achieves better dynamic effect of the light spot.

Further, the second rotating assembly is provided with a driving gear, the driven assembly of the pattern base comprises a peripheral gear arranged at the periphery of the pattern base, and the peripheral gear meshes with and is connected to the driving gear, such that the pattern base rotates together with the pattern sheet around the center of the pattern base to form a dynamic pattern effect.

Further, the first rotating assembly comprises a central shaft arranged at the center of the effect wheel bottom plate, a bearing is sheathed outside the central shaft, a shaft sleeve is sheathed outside the bearing, an effect wheel driving belt pulley is sheathed outside the shaft sleeve, and the effect wheel driving belt pulley is driven by an external driving motor to rotate so as to drive the effect wheel bottom plate to rotate around the central shaft so as to enable different pattern bases or the light-through hole on the effect wheel bottom plate to be switched into or out of the light path.

Further, the second rotating assembly further comprises a pattern base driving belt pulley, and the pattern base driving belt pulley is sheathed outside the shaft sleeve and is fixedly mounted to the driving gear; and the pattern base driving belt pulley is driven by the external driving motor to rotate so as to drive the driving gear to rotate around the central shaft, and the driving gear drives the peripheral gear to rotate so as to drive the pattern base to rotate on the axis thereof, such that the pattern sheet on the pattern base rotates along with the rotation of the pattern base, thereby forming a dynamic pattern effect.

In the present invention, the effect wheel driving belt pulley drives the entire effect wheel bottom plate to rotate around the central shaft and is used to switch different pattern bases or the light-through hole into the light path; and the pattern base driving belt pulley drives the pattern base and the pattern sheet thereon to rotate around the center thereof to generate a dynamic effect.

Further, the effect wheel bottom plate is in a circular shape, and the several pattern bases are arranged in the circumference of the effect wheel bottom plate around the center of a circle of the effect wheel bottom plate.

Further, the distance from the center of the light spot formed by the light path in the light-through hole to the center of the effect wheel bottom plate is consistent with the distance from the center of the light spot formed by the light path on the pattern wheel to the center of the effect wheel bottom plate; and the size of the light-through hole is greater than that of the light spot formed by the light path in the light-through hole.

Further, the effect wheel bottom plate is provided with a pattern base anti-release fastener at a position corresponding to the position where the pattern base is mounted, and the pattern base is further provided with a pattern base built-in insertion plate for fixing the pattern base, with a front end of the pattern base built-in insertion plate being inserted into the effect wheel bottom plate, and a rear end thereof being fixed to the pattern base anti-release fastener; and one end of the pattern base anti-release fastener is fixed to the effect plate bottom plate, and the other end thereof is fixed to the pattern base built-in insertion plate.

One end of the pattern base anti-release fastener is fixed on the effect wheel bottom plate via a central shaft of the pattern base anti-release fastener and can rotate freely around the central shaft, and the other end thereof is provided with a groove in a U shape, i.e., a U-shaped groove, with the width of the U-shaped groove being greater than the total thickness of the effect wheel bottom plate and the pattern base effective pattern insertion plate. One side of the U-shaped groove is provided with a raised point, and the pattern base built-in insertion plate is provided with a corresponding recessed point or small hole. When the pattern base anti-release fastener is turned to clamp into the effect wheel bottom plate and the pattern base built-in insertion plate, the raised point and the recessed point are fitted and fastened, such that the pattern base is fixed; and when the pattern base needs to be removed, it is achieved by only releasing the pattern base anti-release fastener. In the present invention, the pattern base anti-release fastener is provided to facilitate removing and fixing the pattern base, and the pattern base can be replaced by only releasing the pattern base anti-release fastener without using other tools.

Further, the driven assembly further comprises a pattern base bearing, the pattern base is fixed to an inner ring of the pattern base bearing, and the pattern base built-in insertion plate is fixed to an outer ring of the pattern base bearing.

The pattern base bearing is mainly used to ensure smoother rotation of the pattern base.

Further, the central shaft is mounted to a fixed shaft of an external base plate for fixing.

Further, the effect wheel bottom plate and one of the pattern bases are each provided with a magnet.

The magnet is used for positioning the initial angle of the pattern base to ensure that the same pattern projected out is at the same angle each time of power-on or start or reset, and can also ensure that the projected patterns are uniform and at the same angle when many machines are arranged in a row.

The present invention further provides a stage light comprising the combined-type dynamic effect wheel described above.

The present invention comprises the following working steps. Firstly, rotating an effect wheel bottom plate, fixing the effect wheel bottom plate after the desired pattern base is switched into a light path, and then rotating the pattern base, such that the pattern base rotates together with a pattern sheet to further form a dynamic pattern effect.

Compared with the prior art, the present invention has the beneficial effects as follows.

(1) By means of providing at least one pattern base on the same effect wheel bottom plate, the switching of multiple dynamic effects as desired with one wheel is implemented.

(2) By means of providing the light-through hole and the pattern bases on the same effect wheel bottom plate, the light path can be selectively switched into the light-through hole or the pattern bases by only rotating the effect wheel bottom plate at different angles, which can also effectively save on the switching space and reasonably utilize the switching space.

(3) According to the present invention, the switching of the light-through hole and the pattern bases, the switching of the pattern bases, and the display of the dynamic effect of the pattern bases rotating on the axes thereof are all driven by the same rotating assembly, which can effectively reduce the installation parts and simplify the installation structure while achieving the switching of multiple stage effects.

DETAILED DESCRIPTION OF EMBODIMENTS

Figure 1:
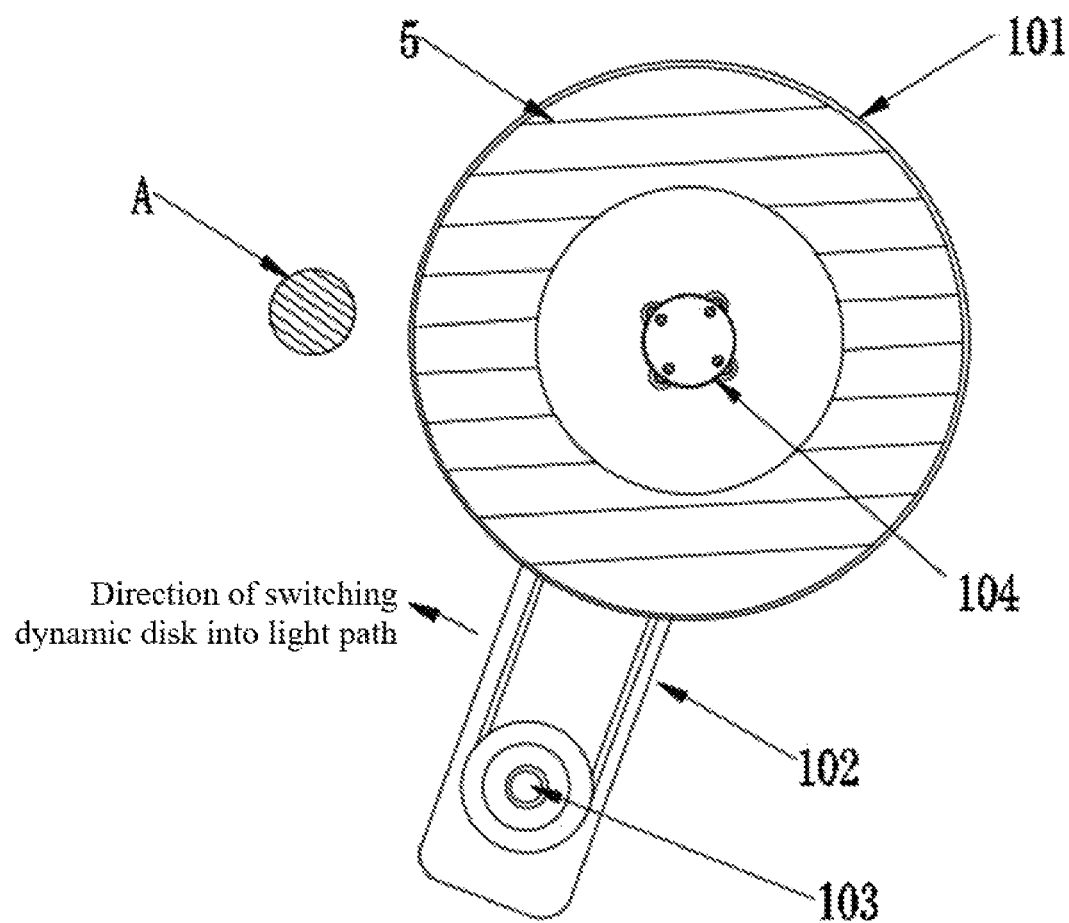
FIG. 1 is a schematic structural diagram of a conventional swing arm switch-in dynamic effect wheel located outside a light path.
Figure 2:
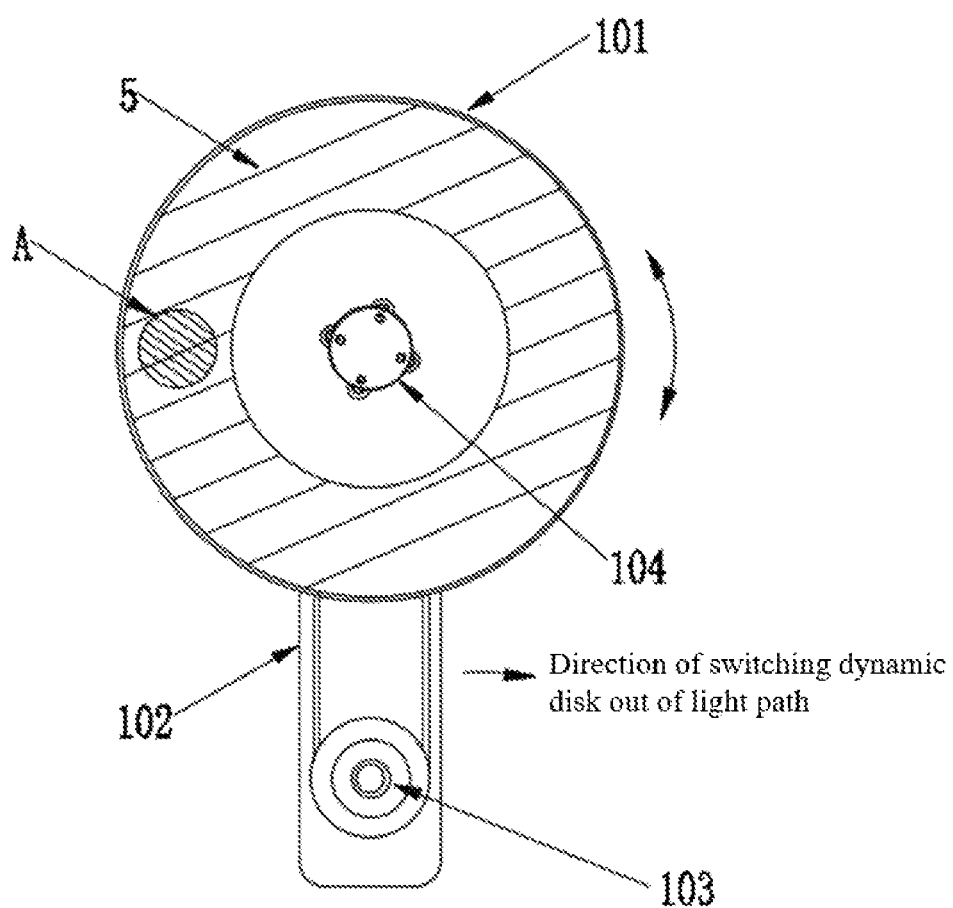
FIG. 2 is a schematic structural diagram of the conventional swing arm switch-in dynamic effect wheel switched into the light path.
Figure 3:
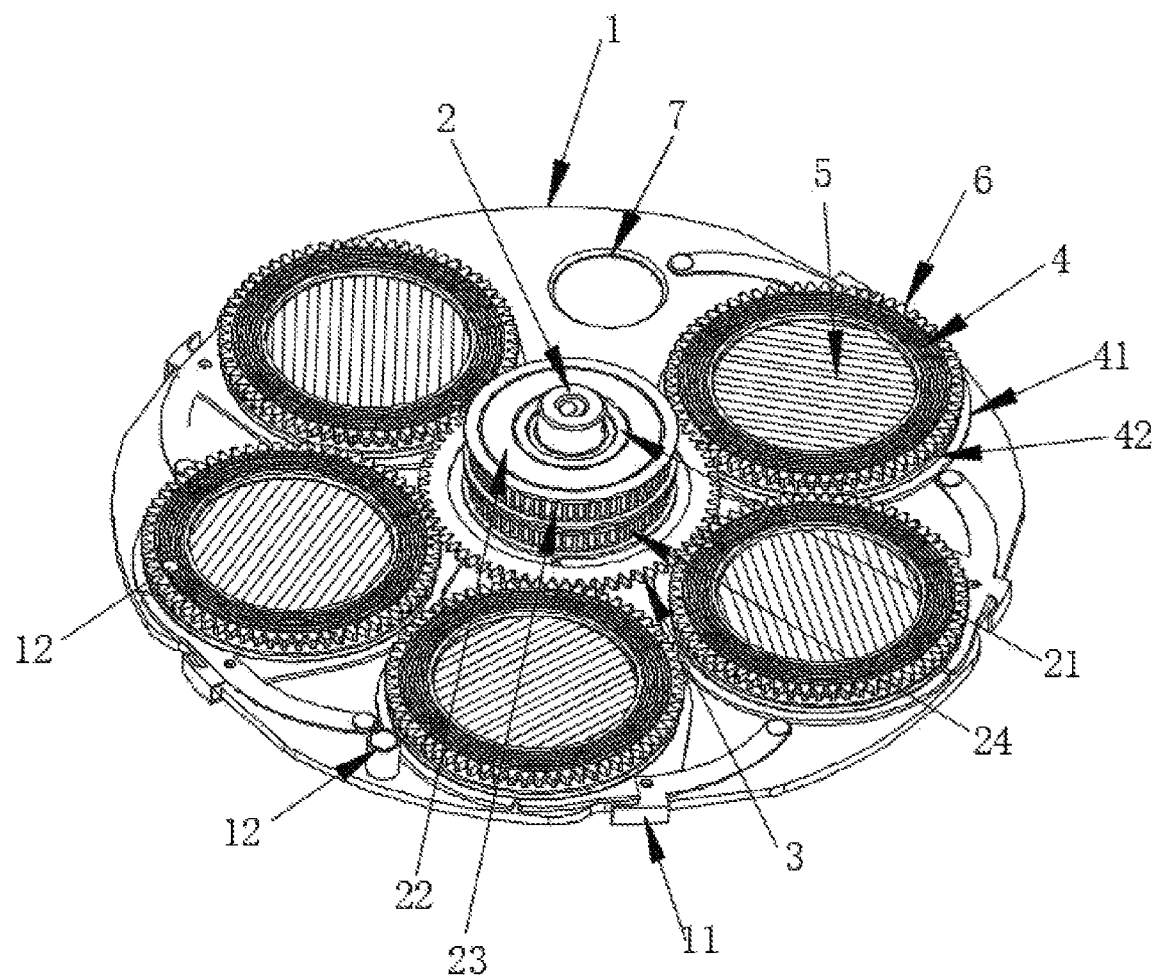
FIG. 3 is a schematic perspective structural diagram of the present invention after being mounted and formed.

As shown in FIG. 3, a combined-type dynamic effect wheel according to one embodiment comprises a light source and an effect wheel bottom plate 1. A center of the effect wheel bottom plate 1 is provided with a central shaft 2. At least one pattern base 4 and a light-through hole 7 are arranged outside the circumference of the effect wheel bottom plate 1. A light beam emitted by the light source selectively passes through the light-through hole 7 or is projected out through one of the pattern bases 4, and a light spot with an obvious boundary formed by the emitted light beam defines an effective light spot. The central shaft 2 can be driven by an external driving motor to rotate, and the effect wheel bottom plate 1 will rotate with the rotation of the central shaft 2, such that different pattern bases 4 or the light-through hole 7 can be switched into or out of the light beam.

Each pattern base 4 is provided with a pattern sheet 5 for switching into a light path of the light source to generate a pattern effect. A pattern distribution region on the pattern sheet 5 defines an effective pattern region, and the size of an effective pattern on the pattern sheet 5 is greater than that of an effective light spot of the light beam passing through the pattern sheet 5. A driving gear 3 is arranged on the central shaft 2. A peripheral gear 6 is provided at the periphery of each pattern base 4. Each peripheral gear 6 meshes with the driving gear 3 on the central shaft 2 and respectively drives each pattern base 4 to rotate around the center thereof. Each pattern sheet 5 then respectively rotates with the rotation of each pattern base 4, and a dynamic pattern effect is thus formed during the rotation.

The present embodiment comprises two levels of respectively independent rotation. For the first level of independent rotation, the effect wheel bottom plate 1 is driven to rotate, and by means of rotation of the effect wheel bottom plate 1, the light path of the light source is selectively located in different pattern bases 4 or in the light-through hole 7. For the second level of independent rotation, one pattern base 4 is driven to rotate around the center thereof, and the pattern sheet 5 on such pattern base 4 is driven to rotate during the continuous rotation of the pattern base 4 around the center thereof, thereby forming a dynamic pattern effect.

Figure 4:
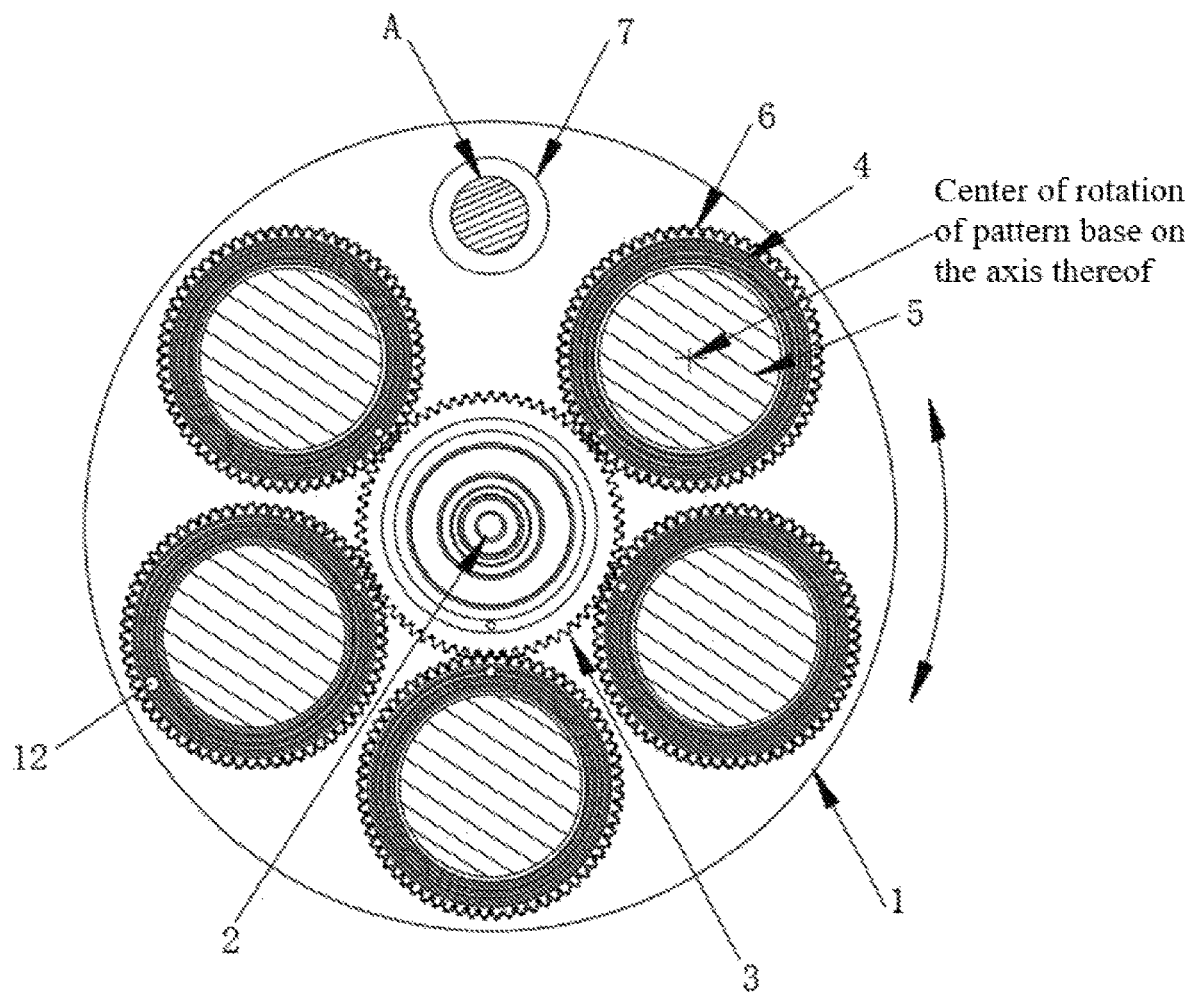
FIG. 4 is a schematic structural diagram of the present invention, with a light path being in the position of a light-through hole.

As shown in FIG. 4, the light spot A in the light path is located in the light-through hole 7, the light path of the light source is not blocked, and the projected light spot is a light source spot that is not processed.

Figure 5:
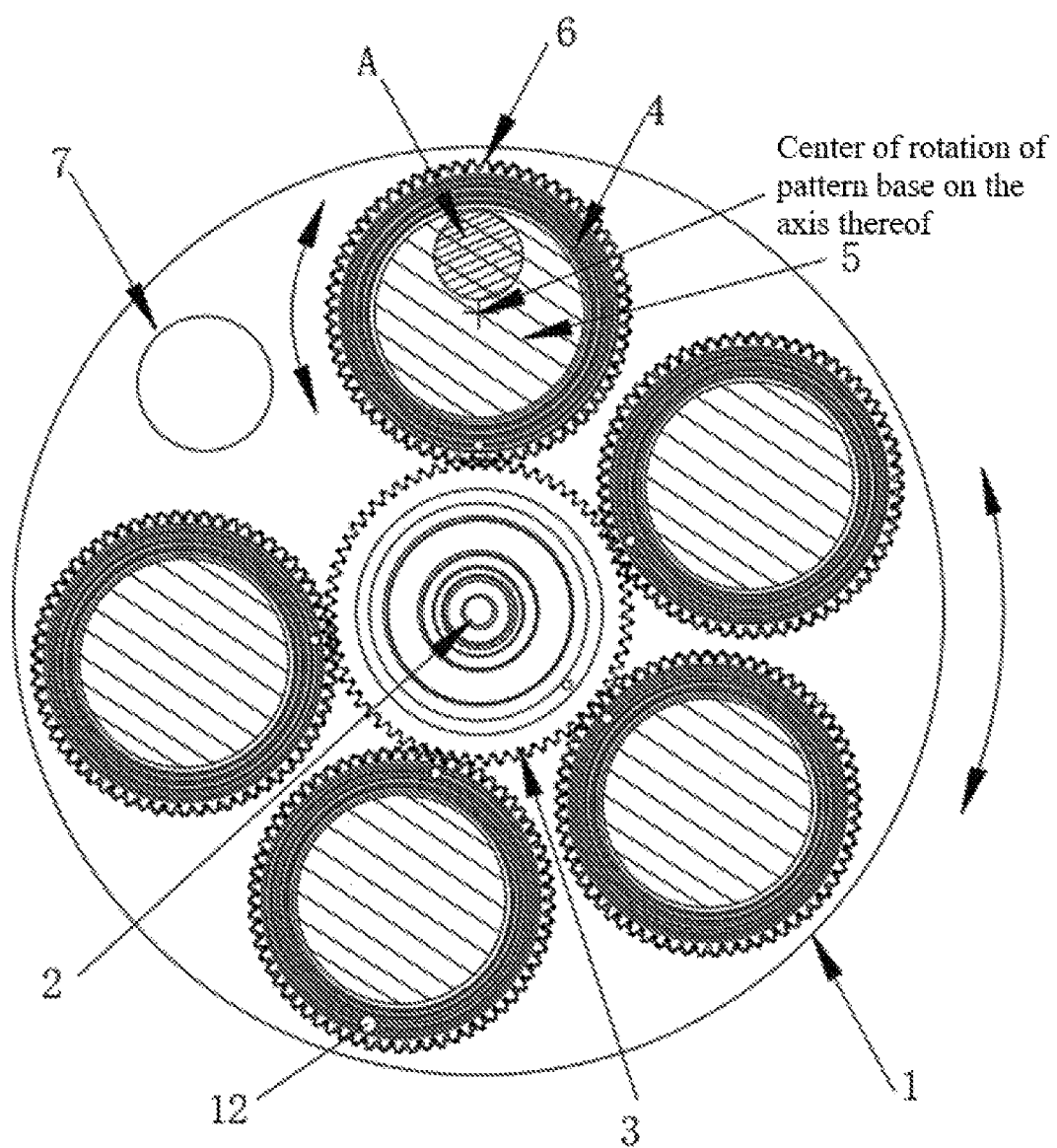
FIG. 5 is a schematic structural diagram of the present invention, with the light path being in a pattern base.

As shown in FIG. 5, the light spot A in the light path is located in one pattern base 4, and the projected light spot is a dynamic pattern light spot of a pattern of the pattern sheet on the pattern base 4 thereof.

In the present embodiment, the effect wheel bottom plate 1 is provided, the effect wheel bottom plate 1 is provided with at least one pattern base 4, each pattern base 4 is provided with one pattern sheet 5 used for switching into the light path of the light source to generate a pattern effect, the central shaft 2 is arranged at the center of the effect wheel bottom plate 1, the central shaft 2 is driven by an electric motor to rotate and, during the rotation, drives the effect wheel bottom plate 1 to rotate, thereby achieving the switching of the pattern base 4 into or out of the light path. By means of rotating the effect wheel bottom plate 1 at different angles, different pattern bases 4 are switched into the light path. After the desired pattern base is switched into the light path, the edge gear 6 at the edge of the pattern base 4 meshes with and is connected to the driving gear 3 on the central shaft 2, and the pattern base 4 is driven to rotate through the rotation of the central shaft 2. Therefore, the pattern base 4 continuously rotates in the light path, and the pattern sheets 5 on the pattern bases 4 pass through the light path in succession, thereby forming a dynamic pattern effect. Different pattern bases 4 are switched into the light path to generate different dynamic pattern effects.

Therefore, the present embodiment can achieve switching of multiple dynamic pattern effects as desired under the drive of the same driving structure, and has the beneficial effects of simple structure, convenient installation, and easy implementation.

As shown in FIG. 3, a bearing 21 is sheathed outside the central shaft 2, a shaft sleeve 22 is sheathed outside the bearing 21, an effect wheel driving belt pulley 23 is sheathed outside the shaft sleeve 22, and the effect wheel driving belt pulley 23 is driven by an external driving motor to rotate so as to drive the effect wheel bottom plate 1 to rotate around the central shaft 2 so as to enable different pattern bases 4 or the light-through hole 7 on the effect wheel bottom plate 1 to be switched into or out of the light path.

A pattern base driving belt pulley 24 is provided below the effect wheel driving belt pulley 23, and the pattern base driving belt pulley 24 is sheathed outside the shaft sleeve 21 and is fixedly riveted into a whole with the driving gear 3; and the pattern base driving belt pulley 24 is driven by the external driving motor to rotate so as to drive the driving gear 3 to rotate around the central shaft 2, the driving gear 3 drives the peripheral gear 6 to rotate so as to drive the pattern base 4 to rotate on the axis thereof, and the pattern sheet 5 on the pattern base 4 rotates with the rotating of the pattern base 4, thereby forming a dynamic pattern effect.

In the present invention, the effect wheel driving belt pulley 23 drives the entire effect wheel bottom plate 1 to rotate around the central shaft 2 and is used to switch different pattern bases 4 or the light-through hole 7 into the light path; and the pattern base driving belt pulley 24 drives the pattern base 4 and the pattern sheet 5 thereon to rotate around the center thereof to generate a dynamic effect.

The center of the light-through hole 7 coincides with the center of the light spot formed by the light path in the light-through hole 7, the diameter of the light-through hole 7 is greater than twice the size of the light spot A formed by the light path in the light-through hole 7, and the distance from the center of the light spot A formed by the light path in the light-through hole 7 to the center of the effect wheel bottom plate 1 is consistent with the distance from the center of the light spot A formed by the light path on the pattern wheel 4 to the center of the effect wheel bottom plate 1. The pattern base 4 is arranged in a circular shape, with the radius of the pattern base 4 being greater than the diameter of the light spot A formed by the light path in the pattern base 4, and the center of the pattern sheet 5 is located outside the light spot.

As shown in FIGS. 3 and 5, the effect wheel bottom plate 1 is provided with a pattern base anti-release fastener 11 at a position corresponding to the position where the pattern base 4 is mounted, and the pattern base is further provided with a pattern base built-in insertion plate 41 for fixing the pattern base 4, with a front end of the pattern base built-in insertion plate 41 being inserted into the effect wheel bottom plate 1, and a rear end thereof being fixed to the pattern base anti-release fastener 11.

The pattern base 4 is further provided with a pattern base bearing 42, the pattern base 4 is fixed to an inner ring of the pattern base bearing 42, and the pattern base built-in insertion plate 41 is fixed to an outer ring of the pattern base bearing 42.

The effect wheel bottom plate 1 and one of the pattern bases are each provided with a magnet 12. The magnet 12 is used for positioning the initial angle of a pattern base 4 to ensure that the same pattern projected out is at the same angle each time on power-on or start or reset, and can also ensure that the projected patterns are uniform and at the same angle when many lights are arranged in a row, thereby avoiding the case where one pattern is vertical while another pattern is upside-down or inclined.

Obviously, the embodiments mentioned above of the present invention are merely examples made for clear illustration of the technical solution of the present invention, and are not intended to limit the specific embodiments of the present invention. Any modifications, equivalent replacements, improvements, etc., made within the spirit and principle of the claims of the present invention should fall within the scope of protection of the present invention.

The invention claimed is:

1. A combined dynamic effect wheel, comprising: a light source; and an effect wheel bottom plate, wherein the effect wheel bottom plate is provided with a light-through hole and several pattern bases, each pattern base is provided with a pattern sheet, a pattern distribution region on the pattern sheet defines an effective pattern region; a light beam emitted by the light source selectively passes through the light-through hole or is projected out through one of the several pattern bases, and a light spot with a boundary formed by the emitted light beam defines an effective light spot; wherein a first rotating assembly and a second rotating assembly are provided at a center shaft of the effect wheel bottom plate at a side of the several pattern bases, the first rotating assembly and the second rotating assembly are arranged coaxially; the effect wheel bottom plate is driven by the first rotating assembly to rotate so as to enable different pattern bases or the light-through hole to be switched in or out of a light path; wherein each pattern base is provided with a driven assembly which is fitted and connected to the second rotating assembly and is driven by the second rotating assembly to rotate so as to drive the pattern sheet to rotate, wherein the size of the effective pattern on the pattern sheet is greater than twice the size of the effective light spot of the light beam passing through the pattern sheet, and when the pattern sheet is switched into the light path, the effective light spot of the light beam passing through each pattern sheet is distributed outside a center point of the pattern sheet, and when the pattern sheet is switched into the light path, the pattern sheet forms a dynamic pattern effect during the rotation thereof.

2. The combined-type dynamic effect wheel according to claim 1, wherein the first rotating assembly is placed over the second rotating assembly.

3. The combined-type dynamic effect wheel according to claim 1, wherein the second rotating assembly is provided with a driving gear, the driven assembly of each pattern base comprises a peripheral gear arranged at the periphery of each pattern base, and the peripheral gear meshes with and is connected to the driving gear, such that each pattern base rotates together with the pattern sheet around a center thereof to form a dynamic pattern effect.

4. The combined-type dynamic effect wheel according to claim 1, wherein the first rotating assembly comprises an effect wheel driving belt pulley, a bearing is sheathed outside the central shaft, a shaft sleeve is sheathed outside the bearing, the effect wheel driving belt pulley is sheathed outside the shaft sleeve, and the effect wheel driving belt pulley is driven by an external driving motor to rotate so as to drive the effect wheel bottom plate to rotate around the central shaft so as to enable different pattern bases or the light-through hole on the effect wheel bottom plate to be switched into or out of the light path.

5. The combined-type dynamic effect wheel according to claim 4, wherein the second rotating assembly further comprises a pattern base driving belt pulley which is sheathed outside the shaft sleeve and is fixedly mounted to the driving gear; and wherein the pattern base driving belt pulley is driven by the external driving motor to rotate so as to drive a driving gear of the second rotating assembly to rotate around the central shaft, and the driving gear drives a peripheral gear of the driven assembly of the pattern base to rotate so as to drive each pattern base to rotate on the axis thereof, such that the pattern sheet on each pattern base rotates along with the rotation of each pattern base, thereby forming a dynamic pattern effect.

6. The combined-type dynamic effect wheel according to claim 4, wherein the central shaft is mounted to a fixed shaft of an external base plate for fixing.

7. The combined-type dynamic effect wheel according to claim 1, wherein a distance from a center of the light spot formed by the light path in the light-through hole to the center of the effect wheel bottom plate is consistent with a distance from the center of the light spot formed by the light path on the pattern wheel to the center of the effect wheel bottom plate; and the size of the light-through hole is greater than that of the light spot formed by the light path in the light-through hole.

8. The combined-type dynamic effect wheel according to claim 1, wherein the effect wheel bottom plate is provided with several pattern base anti-release fasteners at a position where the several pattern bases are mounted correspondingly, and wherein each pattern base is further provided with a pattern base built-in insertion plate for correspondingly fixing the several pattern bases, with a front end of each pattern base built-in insertion plate being inserted into the effect wheel bottom plate, and a rear end thereof being fixed to the pattern base anti-release fastener; and one end of each pattern base anti-release fastener is fixed to the effect plate bottom plate, and the other end thereof is respectively fixed to each pattern base built-in insertion plate.

9. The combined-type dynamic effect wheel according to claim 8, wherein the driven assembly further comprises a pattern base bearing, the pattern base is fixed to an inner ring of the pattern base bearing, and the pattern base built-in insertion plate is fixed to an outer ring of the pattern base bearing.

10. The combined-type dynamic effect wheel according to claim 1, wherein the effect wheel bottom plate is in a circular shape, and the several pattern bases are arranged around a center of a circle of the effect wheel bottom plate.

11. The combined-type dynamic effect wheel according to claim 1, wherein the effect wheel bottom plate and one of the several pattern bases are each provided with a magnet.

12. A stage light, comprising the combined-type dynamic effect wheel according to claim 1.

\* \* \* \* \*